United States Patent

[11] 3,634,823

[72] Inventors Walter Dietrich
Pforzheim;
Rudolf Schlupp, Kornwestheim, both of Germany

[21] Appl. No. 824,752
[22] Filed May 9, 1969
[45] Patented Jan. 11, 1972
[73] Assignee International Standard Electric Corporation
New York, N.Y.
by said Dietrich
[32] Priority May 22, 1968
[33] Germany
[31] P 17 74 314.5

[54] OPTICAL CHARACTER RECOGNITION ARRANGEMENT

8 Claims, 18 Drawing Figs.

[52] U.S. Cl. 340/146.3 Y
[51] Int. Cl. G06k 9/12
[50] Field of Search 340/146.3

[56] References Cited

UNITED STATES PATENTS

| | | | |
|---|---|---|---|
| 3,496,542 | 2/1970 | Rabinow | 340/146.3 |
| 3,178,688 | 4/1965 | Hill et al. | 340/146.3 |
| 3,290,651 | 12/1966 | Paufve et al. | 340/146.3 |

*Primary Examiner*—Maynard R. Wilbur
*Assistant Examiner*—Leo H. Boudreau
*Attorneys*—C. Cornell Remsen, Jr., Walter J. Baum, Percy P. Lantzy, Philip M. Bolton, Isidore Togut and Charles L. Johnson, Jr.

ABSTRACT: Process of optical character recognition for different sizes of character, in which the characters are scanned in columns, stored in a shift register, removed therefrom in rows and the bit combinations are associated with outlets in a "probe" network. Then the bit combination, thus determined, of the character to be recognized is compared with the bit combinations of all of the stored compare characters simultaneously taking into account the location of the character in the character area, and the number of agreements is determined. The greatest number of agreements determines the character.

INVENTORS
WALTER DIETRICH,
RUDOLF SCHLUPP
BY [signature]
ATTORNEY

INVENTORS
WALTER DIETRICH,
RUDOLF SCHLUPP
BY [signature]
ATTORNEY

PATENTED JAN 11 1972 3,634,823

SHEET 03 OF 11

INVENTORS

WALTER DIETRICH,
RUDOLF SCHLUPP

BY [signature]

ATTORNEY

| | | | | | |
|---|---|---|---|---|---|
| 1 | 0 | 0 | 0 | 0 | 0 |
| 2 | 1 | 0 | 0 | 0 | 0 |
| 3 | 0 | 1 | 0 | 0 | 0 |
| ' | 1 | 1 | 0 | 0 | 0 |
| ' | 0 | 0 | 1 | 0 | 0 |
| ' | 1 | 0 | 1 | 0 | 0 |
| ' | 0 | 1 | 1 | 0 | 0 |
| ' | 1 | 1 | 1 | 0 | 0 |
| ' | 0 | 0 | 0 | 1 | 0 |
| ' | 1 | 0 | 0 | 1 | 0 |
| ' | 0 | 1 | 0 | 1 | 0 |
| ' | 1 | 1 | 0 | 1 | 0 |
| ' | 0 | 0 | 1 | 1 | 0 |
| ' | 1 | 0 | 1 | 1 | 0 |
| 15 | 0 | 1 | 1 | 1 | 0 |
| 16 | 1 | 1 | 1 | 1 | 0 |
| 17 | 0 | 0 | 0 | 0 | 1 |
| ' | 1 | 0 | 0 | 0 | 1 |
| ' | 0 | 1 | 0 | 0 | 1 |
| ' | 1 | 1 | 0 | 0 | 1 |
| ' | 0 | 0 | 1 | 0 | 1 |
| ' | 1 | 0 | 1 | 0 | 1 |
| ' | 0 | 1 | 1 | 0 | 1 |
| ' | 1 | 1 | 1 | 0 | 1 |
| ' | 0 | 0 | 0 | 1 | 1 |
| ' | 1 | 0 | 0 | 1 | 1 |
| ' | 0 | 1 | 0 | 1 | 1 |
| ' | 1 | 1 | 0 | 1 | 1 |
| ' | 0 | 0 | 1 | 1 | 1 |
| ' | 1 | 0 | 1 | 1 | 1 |
| 31 | 0 | 1 | 1 | 1 | 1 |
| 32 | 1 | 1 | 1 | 1 | 1 |

INVENTORS
WALTER DIETRICH,
RUDOLF SCHLUPP
BY Menotti Lombardi
ATTORNEY

INVENTORS
WALTER DIETRICH,
RUDOLF SCHLUPP
BY
ATTORNEY

INVENTORS
WALTER DIETRICH,
RUDOLF SCHLUPP
BY [signature]
ATTORNEY

INVENTORS

WALTER DIETRICH,
RUDOLF SCHLUPP

BY [signature]

ATTORNEY

INVENTORS
WALTER DIETRICH,
RUDOLF SCHLUPP
BY
ATTORNEY

INVENTORS

WALTER DIETRICH,
RUDOLF SCHLUPP

BY [signature]

ATTORNEY

INVENTORS
WALTER DIETRICH,
RUDOLF SCHLUPP
BY
ATTORNEY

INVENTORS
WALTER DIETRICH,
RUDOLF SCHLUPP

BY

ATTORNEY

AN OPTICAL CHARACTER RECOGNITION ARRANGEMENT

BACKGROUND OF THE INVENTION

This invention relates to a process of automatic character recognition, and more particularly to a process of evaluating stored information for the purpose of character recognition.

There are a large number of various recognition processes, some of which are divided into analogue and digital processes according to their essential function. One of the best known analogue-type processes is used with the magnetic script font E 13 B. In this case the character, printed in magnetic ink, is rapidly drawn past the air gap of a magnetic head. The output of the magnetic head provides a voltage waveform whose amplitude at any given instant corresponds to the variation of the ink in the direction of the length of the gap, according to the law of induction. The voltage waveform has a characteristic shape for each character and is stored in a delay line. It is evaluated with the aid of resistance networks having the characteristic of each character, and connected specially provided tappings of the delay line. The resistance network associated with the character just scanned provides the greatest output potential, which is selected from the output potentials of all of the resistance networks by means of an extreme value detecting circuit, and the character read is thus converted to an external signal. This process works as long as the printing quality is very good. If this is not good, this process makes mistakes, or may even foil due to the lack of information to be extracted from a single track by a magnetic head.

In optical character-recognition systems it is desirable and necessary to permit comparatively poor printings. Therefore, a number of parallel tracks are provided, each having light transducing devices for scanning the character, and an equal number of delay lines having tappings from which there is derived a voltage distribution which corresponds to the shape of the character. The amplitude of the voltages is determined by the density of the character, and the character is recognized by means of one resistance network per character followed by an extreme value detecting circuit. The resistance networks in this case is two-dimensional.

A reading process of this kind operates with analogue values, providing, at a given resolution, the maximum information for the recognition circuits. The resistance networks derived from this configuration theoretically allows characters with extremely unfavorable properties to be recognized, if such characters are suitably designed.

However, such pure analogue-type processes in practice have serious drawbacks. In order to achieve the speeds usually obtained in digital data processing, it is necessary to process the scan-data largely in parallel. To obtain a system in which the extreme value detecting circuit can pick out the correct character, i.e., the highest voltage, with certainty from the other characters and in particular from the next largest (equal voltage) it is necessary for the equipment to be largely interference free. Finally, mention should be made of "centralizing," a process involving the shift of the electrically stored information to the recognition circuits. This process has not been satisfactorily established with analogue potential values, as yet, and it has been necessary to seek a solution in other directions, for example, by multiplication of the recognition circuits.

These factors of parallel processing of information, extensive interference suppression, and centralization, involve great expense and can adversely affect operational reliability, which can frequently be better overcome by the use of suitable digital methods.

It is known to replace delay lines by digital shift registers, the evaluation of the information stored therein being effected similar to resistance networks. This has the additional advantage for extreme value detecting circuits in that the digital voltages are intrinsically free of interference.

The resistance networks are generally in the form of star connections in which one end of the resistor is connected to one point of the two-dimensional store, and the other end is common to all resistors and is connected to the input of the extreme value detecting circuit. When the set of characters involves a large number of characters, high resolution and a large number of storage points is necessary, and one resistor is required for nearly every storage point requiring a large number of resistors per network. Typically, 200 resistors for one network, i.e., for one character. As the number of different characters increases, the voltage difference between the peak voltage for the correct character and the next largest voltage for the most similar, but incorrect character, decreases, and the risk of faulty recognition becomes greater.

If a further character is to be added to the set of characters having an existing meaning but a slightly different shape, (such as the closed-top and open-top digit "4"), it is still necessary to provide another resistance network.

Such a "different character" is also produced when a character is changed in size, even thought it retains its meaning and its shape. For example, in the standardization of digits and capital letters for optical character recognition, four sizes are provided for each character to make allowances for different types of print. It will be readily appreciated that in such cases the number of recognition circuits is considerable.

The invention avoids the uncertain determination of the peak voltage and the complicated extension of the recognition circuit to other characters, particularly similar characters.

SUMMARY OF THE INVENTION

It is thus an object of the invention to provide a process and arrangement for automatic character recognition not suffering from the aforementioned disadvantages.

The invention relates to a process of automatic character recognition, in which the characters are divided into their characteristic shape elements.

The invention is characterized in that the scanned and electrically stored shape elements are detected by probes corresponding to the shape elements, in that the shape elements are successively fed to the probes, in that the probe most similar to the particular shape element is detected by means of a first extreme value detecting circuit, whereupon the probe thus detected is assigned to the relevant character on the basis of its location in the character area, and in that for each character the number of probes assigned thereto is stored and the character with the largest number of assigned shape elements is determined and thus recognized by means of a second extreme value detecting circuit.

The system is particularly suitable when the character area is scanned on a raster basis and in each field a Yes-No statement is made for "black" or "white." It is then possible to distribute the shape elements in such a manner that the distribution of black and white in one or more rows or columns of the field represents, in each case, one shape element.

In order to make the first majority decision it is convenient to feed the individual rows or columns serially to a probe network. The probe network is also constructed as a matrix and corresponds to the two-dimensional construction of the scanning raster. The probe network may be a resistance network, in which the resistors between the rows and columns are wired such that all possible shape elements may be imitated in the rows or columns. Then by means of an extreme value detecting circuit, it will be determined, for each row or column of the scanning raster, which of the probes in the probe matrix represents the most similar shape element.

By means of a recognition circuit all of the detected shape elements are assigned to the relevant character or characters. Since the individual shape elements may each occur in several characters but may only occur altogether in one particular character, a second majority decision is made to determine the character in which the shape elements occur most.

The assignment of the probe signals to the characters must also take into consideration the two-dimensional nature of the arrangement. To simplify the recognition circuit it is convenient to feed the probe signals to the recognition circuits in succession, that is, in the order in which they occur, and to provide at the output of the recognition circuit a circuit arrangement which allows for the temporal order of succession. With raster-type scanning the individual rows or columns will be presented to the recognition circuit in succession, which is best achieved by storing the scanned characters in a two-dimensional shift register and presenting the stored information to the probe network row by row or column by column by causing the stored information to be pushed out of the shift register and fed into the probe network, and if necessary, via a further probe register having the capacity of one row or column.

The temporal two-dimensional assignment of the probe signals may then be conveniently carried out by combining the logic elements in such a manner that one logic circuit is provided for each character row or column, and so that the logic circuits are caused to operate in time with the operations involving the presentation of the shift register information to the probe network in succession.

To detect the appropriate shape element is is convenient to allocate a counter to each character, to which counter the respective shape elements are fed in the form of counting pulses, and then to detect the counter showing the highest total. This may be achieved by means of an extreme value detecting circuit connected to the outputs of the counters.

It is usually convenient not to recognize every scan-row and scan-column, but to combine a number of rows or columns together to form zones. One advantage of this is that small displacements of the character in one or other direction, or small printing inaccuracies in the characters have no effect. Another advantage is that characters of different sizes may be recognized by means of the same arrangement. Indexing of the logic circuits will then be effected zone for zone, which may be achieved by means of ring counters.

It will in general be sufficient, in order to save expense in the probe network, to provide only those probes which will be called into operation when evaluating the particular set of characters concerned. However, to make provision for future expansion or modification of the set of characters, all of the possible black and white combinations per row and per column of the scanning raster must be provided in the probe register, although the wiring of the corresponding resistors may be left until required.

BRIEF DESCRIPTION OF THE DRAWINGS

The invention will be best understood by reference to the following description together with the figures, in which.

DESCRIPTION OF PREFERRED EMBODIMENT

Figure 1:
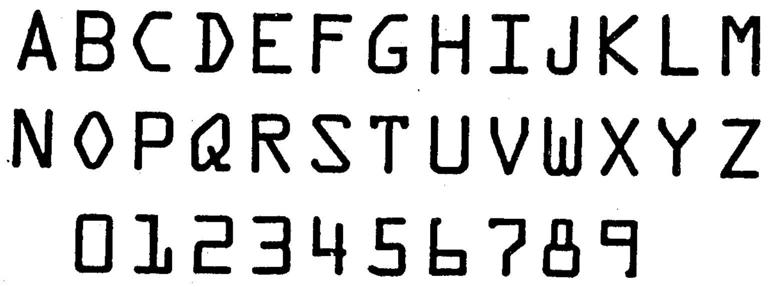
FIG. 1 shows the set of characters designated OCR-A (Optical Character Recognition type of Font A)

In the embodiment described below the characters represented in FIG. 1 (OCR-A) are to be scanned on a raster basis by means of a series of optical transducers which scans the character area column by column.

The invention will now be described in principle with reference to the block diagram shown in FIG. 2. Let it be assumed that the digit "3" is being scanned and is being moved across the series of optical transducers 2 in the direction of the arrow 1. In order to compensate for variations in height, changes of size and printing inaccuracies, the series of optical transducers is longer than the height of the character. The signals from the optical transducers are amplified and digitalized in the associated circuits 3, such that in the case of a black field of the raster a signal appears at the output of the circuit 3 which differs distinctly from the signals arising from the white fields. The signals (0 or 1) appearing at the outputs $a_1$ to $a_{32}$ are stored, column, by column, in the two-dimensional shift register 4 and are moved forward therein again column by column.

When the character is stored in its entirety, it is read out line by line perpendicularly to the storing direction. At each shifting pulse, one line of the character is stored, via a "probe" register 5 adapted to receive only one line at a time, into a probe network 6, which is described in greater detail with reference to FIGS. 3 and 6. The probe network 6 contains as many columns as the shift register 4 and as many rows as are necessary for reliable recognition of the characters, in the present example not more than 32.

At each shifting pulse one of the probes, namely the one most similar to the part (row) of the character stored in the probe register, delivers the strongest signal. This is detected by the extreme value detecting circuit 7 and passed on to the recognition circuit 8. In the recognition circuit there is effected the assignment of the detected probe to all of those characters which have the shape characterized by the said probe in the row under consideration. However, there will be only one character to which all of the statements of the extreme value detecting circuit 7 will apply, that is, the character being scanned, while in the case of all the other characters only some of the signals will apply. Thus the correct character must be detected in a second recognition stage. This is done in the binary counters 9 (Z1 to Z*n*) and the extreme value detecting circuits 10. The binary counters may, if desired, be replaced by other counters. Each of the counters Z1 to Z*n*is allocated to a character included in the set of characters. Thus the recognition signals of the recognition circuit 8, in which the line-for-line assignment of the probe occurs, are fed, via the OR-circuits 11, as counting pulses to those counters whose associated character has the feature exhibited by the probe. Thus that counter (Z1 to Z*n*) will show the highest total which is associated with the character which has been scanned, and the final step is to detect this counter, to which end the extreme value detecting circuit 10 is provided. The significance of the height register 12, the row counter 13 and the zone counter 14 will be discussed with reference to FIG. 9. The shifting and counting clock-pulses are derived from the common clock-pulse generator 15, the necessary controls not being shown, as they are well known.

Following this basic description the invention there will now be described individual parts and functions of the circuit.

As mentioned above, the signals from the optical transducer are amplified and digitalized and given the values 0 or 1. This gives a coarse quantization of the blackness in only two stages, so that in the shift register 4 and the probe register 5 there is required, in each case, only one flip-flop circuit or other digital storage element per storage stage.

Figure 3:
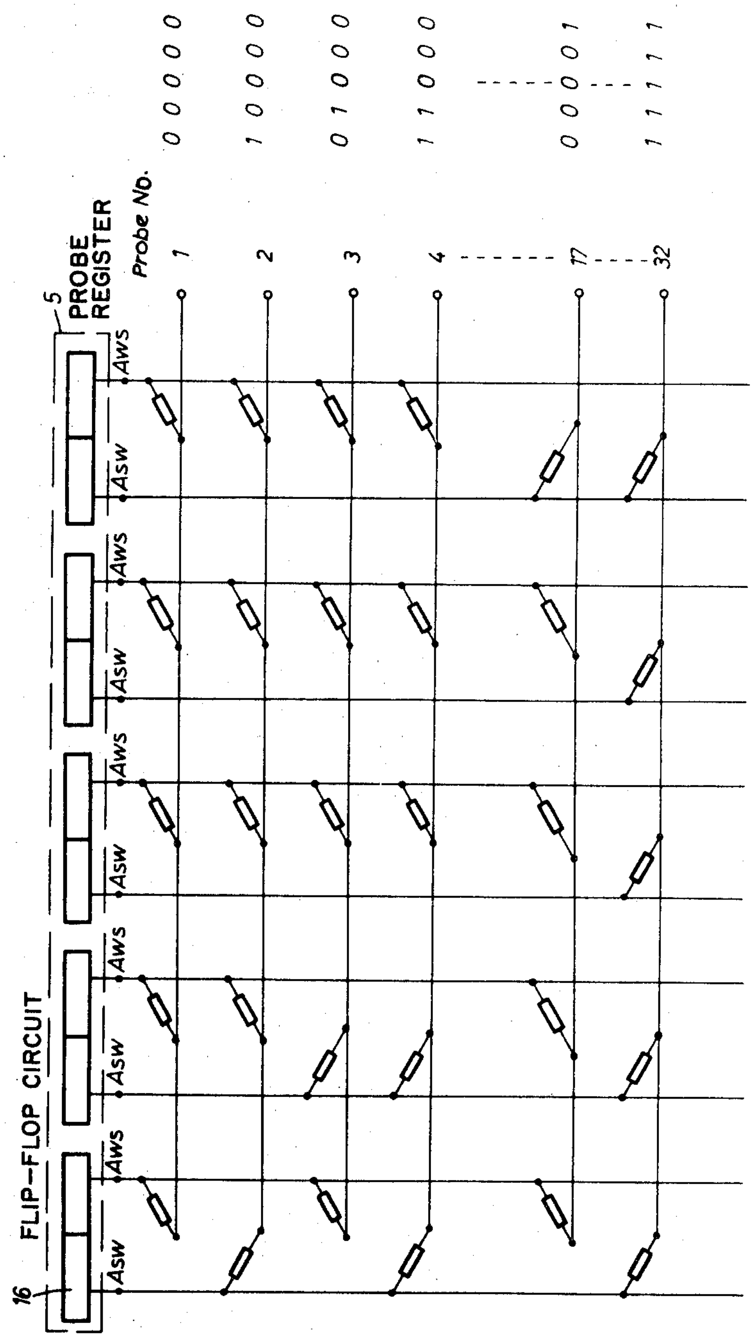
FIG. 3 shows the probe network shown diagrammatically in FIG. 2.

FIG. 3 shows the probe network for this simple distribution. The probes comprise the distributions of "black" and "white" in the individual matrix rows. Since, in the present example, five scan-columns are provided, 32 different distributions of black and white are possible and thus there are 32 possible rows. The right-hand part of FIG. 3 presents the corresponding Code Table, in which "0" means "white" and "1" means "black." The probe register 5 contains five flip-flop circuits 16 each having two outputs of which one will be marked according to whether a "black" or "white" element has been registered in the probe register. To simulate the probes, resistance connections are provided such that for "0," that is a "white" matrix element, the "white" output of the relevant flip-flop circuit 16 is connected to the row conductor. In the case of a "1," that is a "black" matrix element, the "black" output of said circuit is connected to said conductor. On comparing the Code Table in FIG. 3 with the numbers in FIG. 7 it will be seen that in the zones II and V the probe 17 must be providing the largest output, since in that case the wiring of the probe network agrees with the shape element of the scanned digit. In zones II and V the following signals occur, from right to left: black, white, white, white, white, and this corresponds to the wiring of the 17th probe, as will be seen from FIG. 3.

Figures 3A, 11:
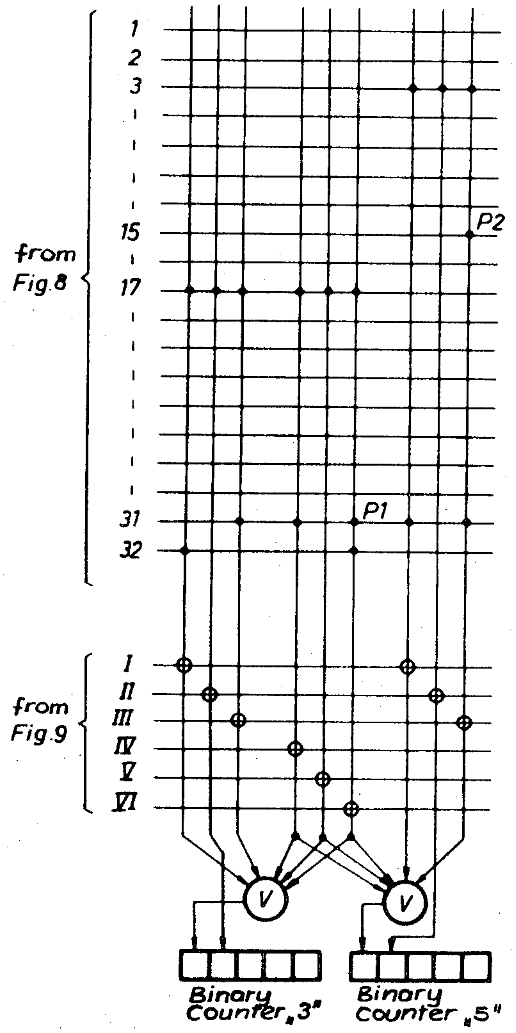
FIG. 3*a* shows he code table for 32 probes.
FIG. 11 shows the method of assigning the probes using the same parts of different characters.

FIG. 3*a* shows the entire Code Table comprising the 32 probes.

Figure 4:
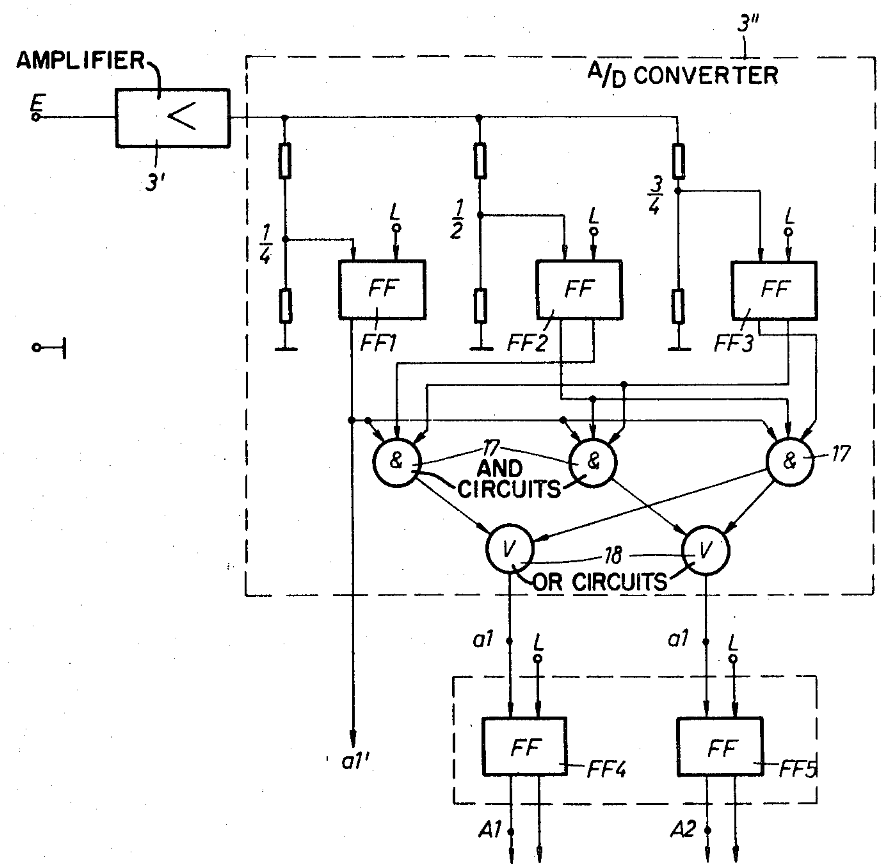
FIG. 4 shows an analogue-to-digital converter having four grey stages.

Frequently, simple black/white digitalization is not sufficient, and it is necessary to insert a number of grey stages. FIG. 4 shows a circuit for converting the analogue signals coming from the optical transducers 2 into four grey stages.

The signals from the optical transducers pass through the amplifier 3′ to the analogue-to-digital converter 3″. This converter consists of three flip-flop circuits FF1, FF2 and FF3 to which the signals are fed via voltage dividers in the proportions ¼, ½ and ¾ in parallel. The other input of the flip-flop circuit is left for canceling, that is, for resetting the flip-flop circuit after its contents have been evaluated, According to the "black" content of the scanned matrix element one or more of the flip-flop circuits will be set to "1" and the "1" output will be marked. The outputs of the flip-flop circuits FF1 to FF3 are interconnected via the AND-circuit 17 and the OR circuit 18 such that the outputs of the flip-flop circuits FF4 and FF5, which constitute a stage of the shift register 4, are marked according to the following table:

| A1 | A2 | |
|---|---|---|
| 0 | 0 | = white raster field |
| 1 | 0 | = light grey raster field |
| 0 | 1 | = dark grey raster field |
| 1 | 1 | = black raster field |

Figure 5:
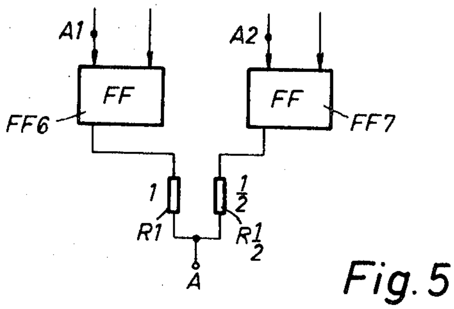
FIG. 5 shows the input stage of the probe register.

FIG. 5 shows the connection of the outputs of the stages of the probe register 5 in the case of one of the stages. It comprises the two flip-flop circuits FF6 and FF7, whose "1" outputs are connected via the resistors R and ½ R to the common output A. Since the resistance values of these two resistors are in the ratio of 2:1, the following voltage proportions occur at the output A:

| A1 | A2 | A | Raster field |
|---|---|---|---|
| 0 | 0 | 0 | white |
| 1 | 0 | ⅓ | light grey |
| 0 | 1 | ⅔ | dark grey |
| 1 | 1 | 1 | black |

Figure 6:
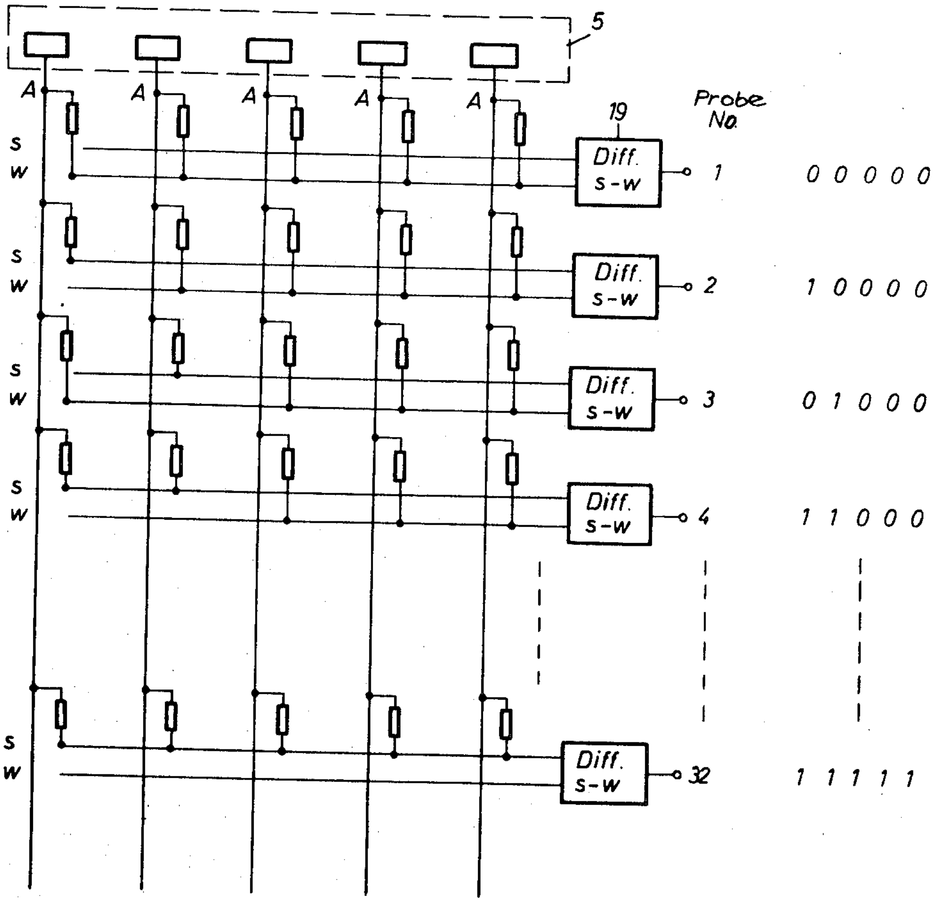
FIG. 6 shows a second embodiment of the probe register.

The outputs A are connected to the associated columns of the probe network 5, the construction of which is illustrated in FIG. 6. Each row (probe) has two conductors, an *s*-conductor and a *w*-conductor, that is, a "black" and a "white" conductor. The output A is connected to the *w*-conductor when the associated raster field and thus the associated probe element is "white," and is connected to the *s*-conductor when the said element is "black." On the right-hand side of FIG. 6 the probe table is shown in part, "0" meaning "white" and "1" meaning "black." The two conductors pairs are each connected to a standard type differential amplifier 19 so as to form the difference between "black" and "white" per probe.

The outputs of the differential amplifiers are connected to the extreme value detecting circuit 7. Since the contents of the shift register 4 are transferred to the probe register 5 row by row and are thus presented to the probe network 6 in a similar manner, there will occur, at each shifting pulse, voltages at the outputs of the probe register 5 which represent the pattern of black and white along a horizontal section through the character area, that is, along a scan-row. The probe whose wiring corresponds to the voltage pattern along this scan-row provides the largest output voltage, which is detected and digitalized by the extreme value detecting circuit 7. If, for example, the character is 18 scan-rows high, the extreme value detecting circuit 7 will provide 18 output signals in sequence, and, the order of which their relation to the vertical position within the character must be taken into consideration for recognition of the character. This is achieved in the clock-pulse-controlled recognition circuit 8, which may be timed by means of the same clock-pulse generator (or at the same frequency) as transfers the data to the shift register 4.

Figure 7C:
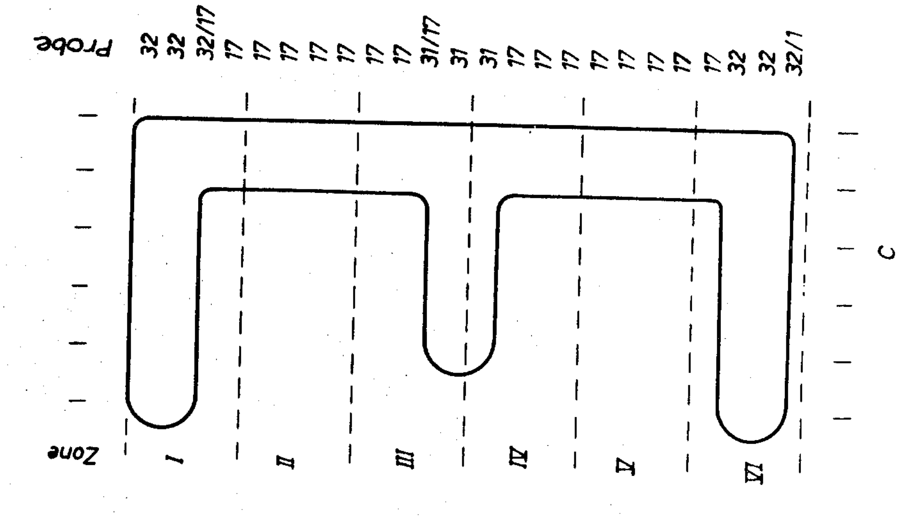
FIG. 7*a* to 7*c* show the digit "3" in three different sizes indicating the zones and relevant probes.
Figure 7B:
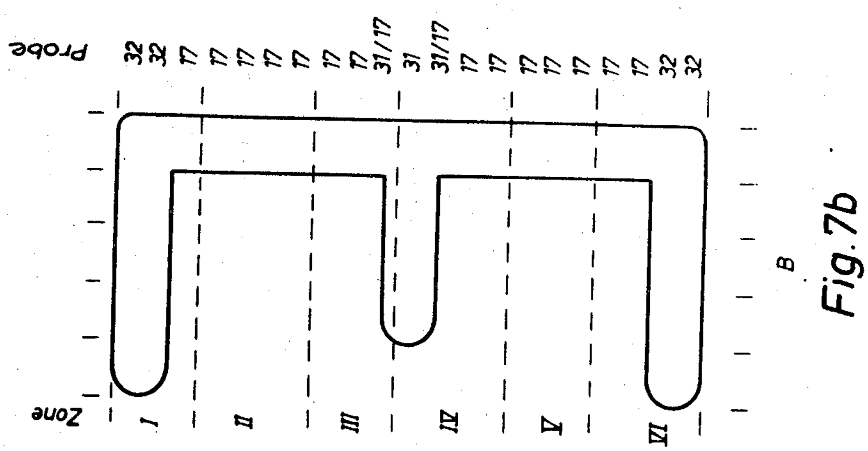
Figure 7A:
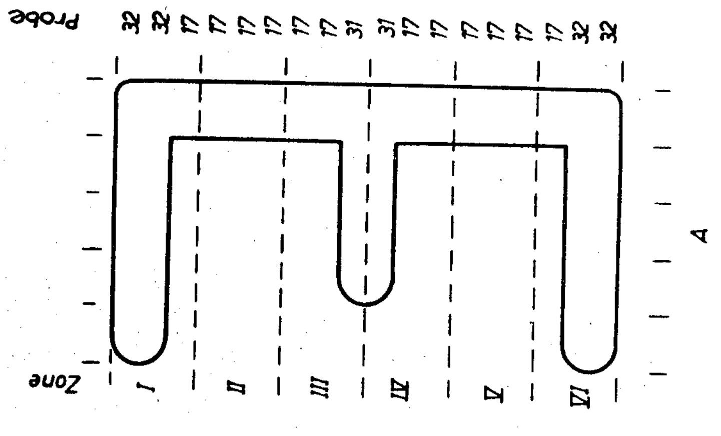

As shown in FIG. 7, the character area, in the present example the digit "3," is divided into six zones I to VI for the purpose of diminishing the data and thus the expense. Each zone includes a certain number of scan-rows according to the size of the character. In FIG. 7*a* the digit "3" is divided into six zones each containing three scan-rows, and in FIG. 7*b* the zones have three or four rows. The exact distribution is given in table 3:

| Zone | Rows per zone for standard size: A | B | C |
|---|---|---|---|
| I | 3 | 3 | 4 |
| II | 3 | 4 | 4 |
| III | 3 | 3 | 4 |
| IV | 3 | 4 | 4 |
| V | 3 | 3 | 4 |
| VI | 3 | 4 | 4 |

The reduction in expense is achieved in that the order of the probes within each zone is no longer of importance.

Thus the number of scan-rows must be switched in dependence upon the size of the character, as indicated in table 3. This switchover will now be described with reference to FIGS. 2 and 9.

There is connected to the shift register 4 (FIG. 2) a height register 12 by which the size (height) of the character is determined. The stages of the height register are set by each black or grey information as arriving at the terminal points *a1′* ... *a32′*. Upon scanning of one character the height information is shifted simultaneously with the shifting of the character information in the shift register 4. AND-circuits 20, 21 and 22 are connected to the outputs of the individual stages of the height register 12. The AND-circuits 20 deal with the characters of standard size A (FIG. 7), the AND-circuits 20 and 21 with the characters of standard size B, and the three AND-circuits together with the characters of standard size C.

Figure 9:
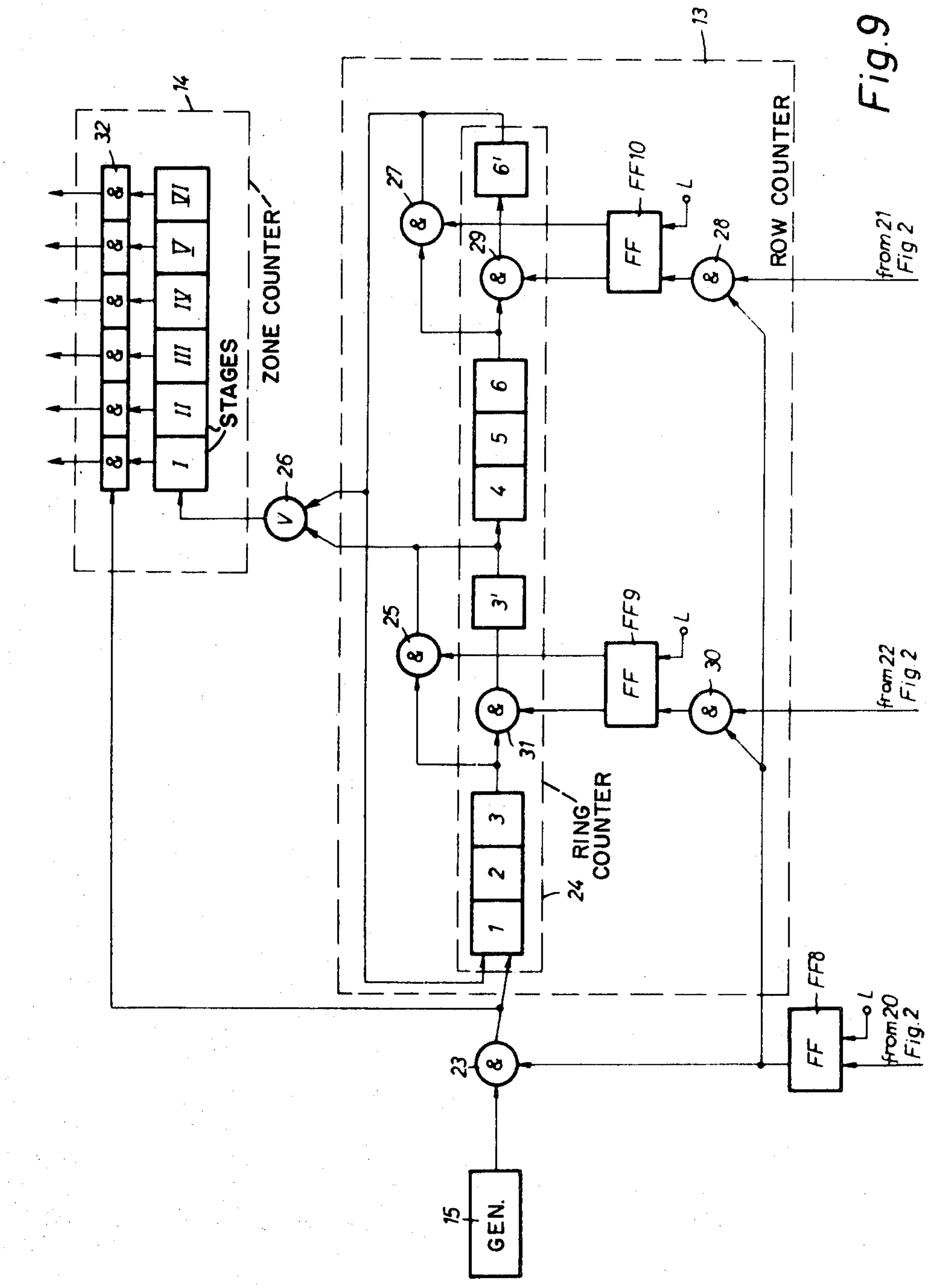
FIG. 9 shows the circuit for switching over the rows and zones depending upon the size of the character.

The outputs of the three AND-circuits 20 to 22 are connected to the row counter 13, which is indexed by the common clock generator 15 and further illustrated in FIG. 9.

The counting pulses pass from the clock generator 15 through the AND-circuit 23 to the first three stages of the ring counter 24 when the flip-flop circuit FF8 is set, that is when the AND-circuit 20 has responded. If the scanned character is of standard size A, the flip-flop circuit FF9 will be in the zero position, so that after the third counting pulse the zone counter 14 will be moved forward from stage I to stage II via the AND-circuit 25 and the OR-circuit 26.

The fourth clock-pulse sets the ring counter to the fourth position via the AND-circuit 25. After the sixth pulse the zone counter 14 is indexed to the stage III, since the flip-flop circuit FF10 is in the zero position and the AND-circuit 27 is thus open.

On the occurrence of the seventh pulse the counter 24 begins to count from the starting position, such that after each third pulse, after every third scan-row, the zone counter 14 is indexed forward.

When a character of standard size B is encountered, the AND-circuit 21 responds and sets the flip-flop circuit FF10 via the AND-circuit 28, whose first input is already marked by the flip-flop circuit FF8, so that the flip-flop circuit FF10 is in the "1" position and as a result the AND-circuit 29 opens and the AND-circuit 27 closes. Thus the seventh pulse will then not pass to the zone counter 14 but to the stage 6' of the ring counter 24, and the changeover sequence given in table 3 for standard size B is achieved.

When a character of standard size C is being scanned the AND-circuit 22 also responds so that the flip-flop circuit FF9 also moves to the "1" position via the AND-circuit 30 with the result that the AND-circuit 25 closes and the AND-circuit 31 opens. This means that the zone counter 14 will be indexed forward after every fourth scan-row.

As shown in FIG. 9, the outputs of the individual stages of the zone counter 14 are connected via AND-circuits 32 to the clock-pulse-controlled recognition circuit 8 so that the latter is interrogated with each shifting pulse.

Figure 8:
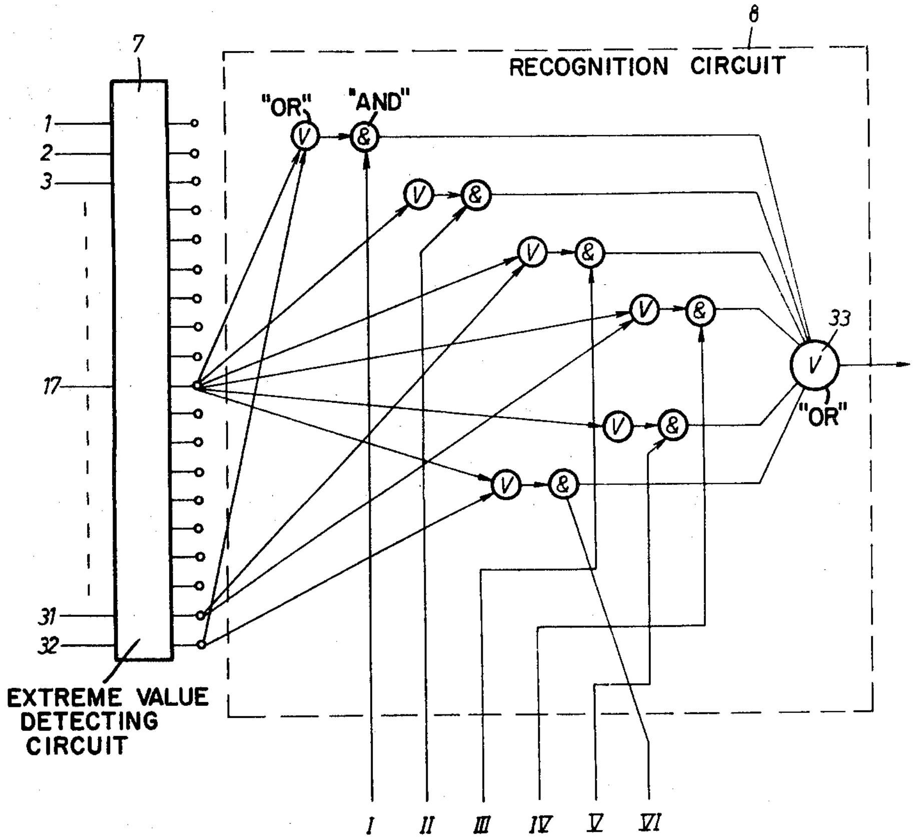
FIG. 8 shows the first extreme value detecting circuit for detecting the probe having the highest output voltage and the clocked recognition circuit for the digit "3"

FIG. 8 shows further details of the clock-pulse-controlled circuit 8, in particular, the method of assigning the 17th probe to the digit "3."

A comparison with the standard size A of the digit "3" in FIG. 7 will show that the probe No. 17 must respond in every zone; the output of the extreme value detecting circuit 7 for this probe is connected, at each zone clock pulse to the output OR-circuit 33 via suitable OR-and AND-circuits. The output of the 31st probe is connected through to the OR-circuit 33 in the third and fourth zones clock pulses and the output of the 32nd probe is connected to said OR-circuit 33 in the first and sixth zone clock pulses. The other probes are not called into operation for the digit "3."

Figure 2:
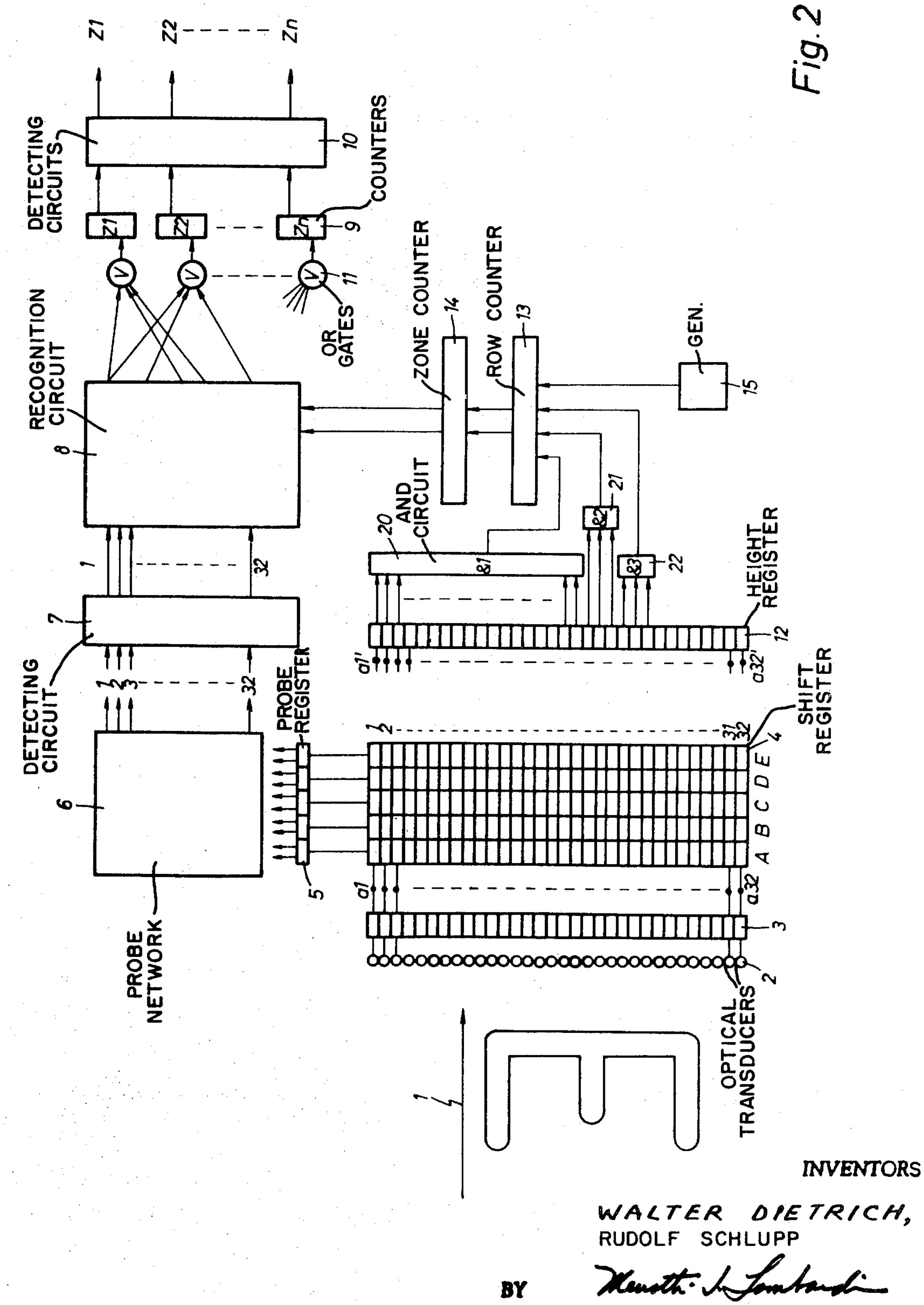
FIG. 2 is a block diagram of the arrangement for carrying out the process of the invention.

Other combinations apply to other digits, which also lead to an output OR-circuit, which are collectively designated by 11 in FIG. 2.

Each of the OR-circuits 11 is connected to the associated counter 9. Thus the output pulses of the OR-circuit 33 (FIG. 8) pass to the counter Z3 to which the digit "3" has been assigned. Thus in the counters 9 (Z1 to Z*n*) the number of responses of one of the probes present is counted. Since this number must be greatest for the scanned character, it is merely necessary to detect the counter showing the highest total.

To ensure safe recognition of the characters it is frequently necessary to pay more (or less) attention to certain statements. For example, the vertical stroke of the digit "3" in zone II is important. FIG. 10 shows some examples of the different weighting of the recognition signals for the digit "3."

Figures 10A, 10B, 10C:
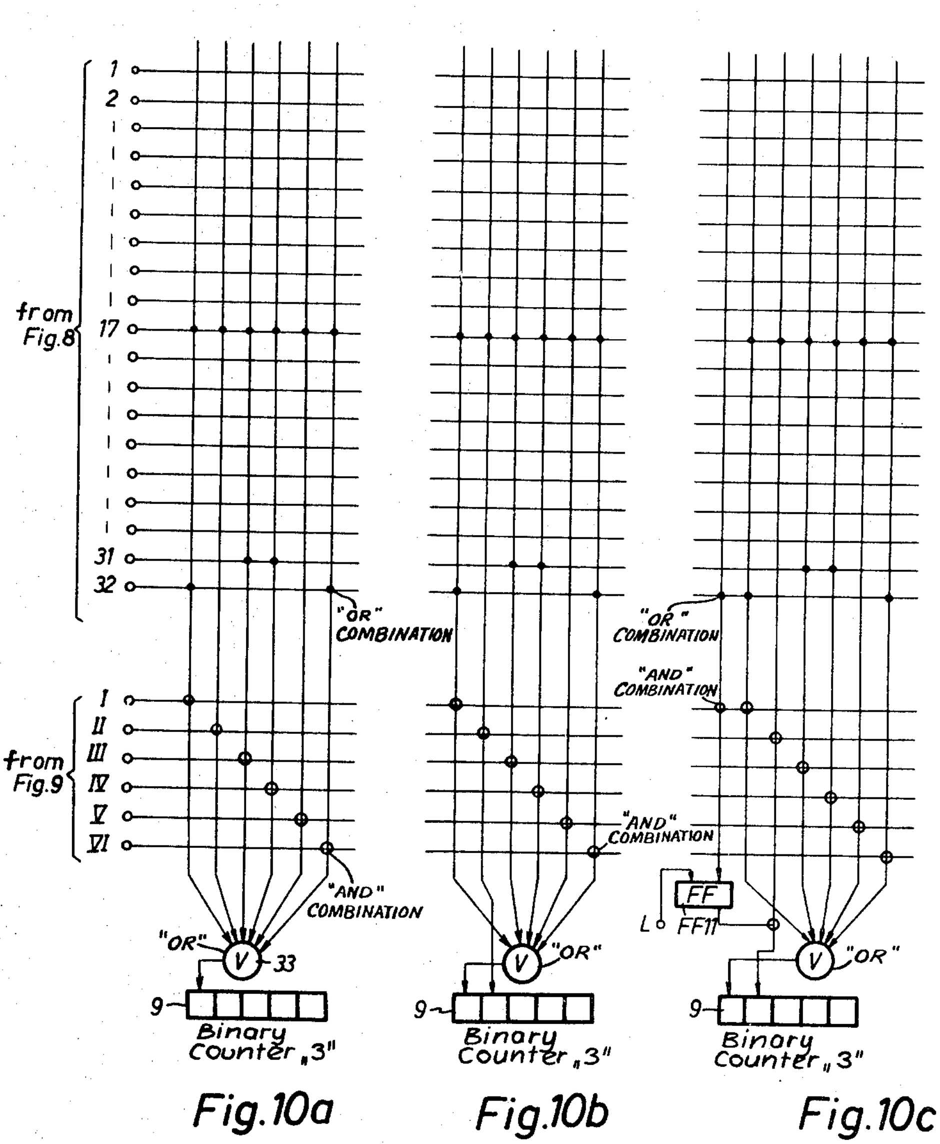
FIGS. 10*a* to 10*c* show circuits for assigning the probes to the characters, in this case the digit "3" with various modifications.

FIG. 10*a* is an overall representation of the recognition logic described with reference to FIG. 8. A solid point of intersection signifies an OR-combination, and a circle means an AND-combination.

According to FIG. 10*b*, the second zone is more weighted than the other zones, since its output conductor leads directly to the second stage of the counter 9. Assuming, for example, that in the case of a well-printed digit "3" of size "A" 18 pulses pass to the associated counter Z3, than all of the other counters will receive fewer counting pulses since in their case one or more probe conditions remain unfulfilled. As will be readily seen from FIG. 10*b*, the statements for the digit "3" are accentuated even more since the counter Z3 now counts to 21. This method of weighting has the advantage that, for example, the extra weight attached to the probe No. 17 of the digit "3" has no deleterious effect on the other digits, not even when the same shape element occurs therein.

Another modification for the purpose of achieving reliable recognition is shown in FIG. 10*c*, in which, in addition, the "-background history" is taken into account. As will be seen from this figure, when a signal occurs in zone I, that is, when a horizontal stroke is encountered—as in the digit "3"—the flip-flop circuit FF11 will be set. Only in such a case can the zone II affect the counter Z3.

In many cases different characters include the same parts or shape elements. It is therefore possible to reduce expense by providing common recognition circuits for such similar parts. For example, the lower parts of the digits "3" and "5" are the same. FIG. 11 shows an example of a circuit for combining the respective recognition logic circuits.

FIG. 11 shows yet another embodiment of the invention.

In this case the resistances probes are all previously and permanently installed irrespective of the set of characters to be scanned and the number of characters in the set. This means that in the extreme case all 32 possible probes will have to be installed. If the quality of the print of the subsequently scanned characters is poor in certain respects or if parts of the character are situated between or on two scanning columns, further probe signals may be introduced to increase the efficiency of recognition. Thus for example the additional connection of the probe set No. 31 at the point P1 will allow the recognition of a shortened bottom stroke of the digit "3" or "5." Similarly, the connection at the point P2 signifies that a recognition signal will be passed to the counter Z5 even when the middle horizontal stroke of the digit "5" is too short.

The embodiments illustrated in FIGS. 10 and 11 indicate the great flexibility of the arrangement of the invention for accommodation thereof to given conditions.

Figure 12:
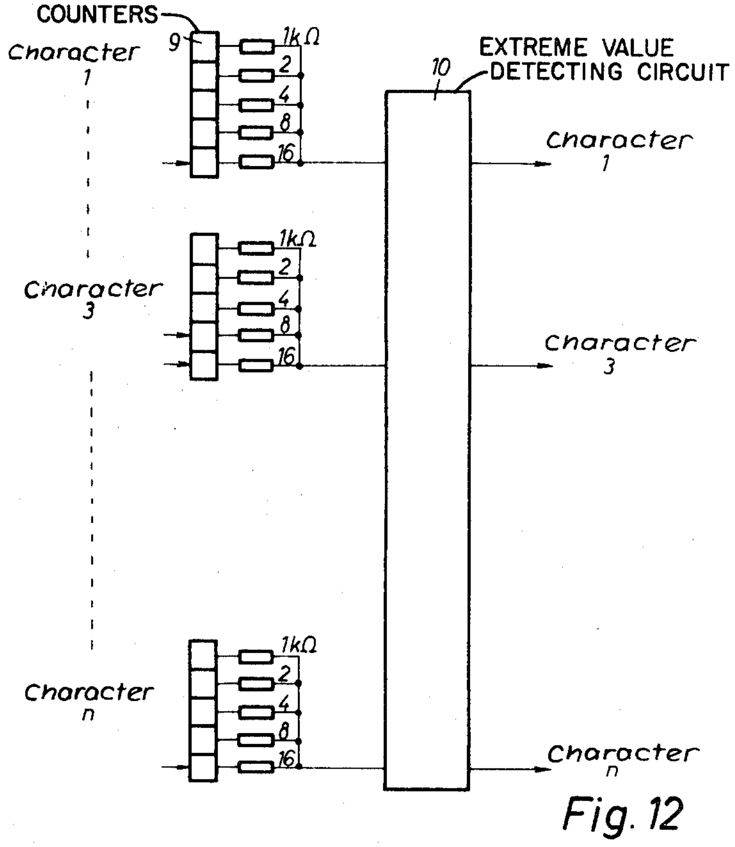
FIG. 12 shows the ring counter for the correct shape element, with the second extreme value detecting circuit.

FIG. 12 shows an embodiment of the extreme value detecting circuit 10.

The outputs of the counters Z1 to Z*n* are connected via binary stepped resistors to the extreme value detecting circuit 10. Stepping of the resistance values effects conversion of the number of counts to a voltage value proportional to said number, which value is available at the junction-point of the resistance network and is passed to the extreme value detecting circuit for the majority decision.

Figure 13:
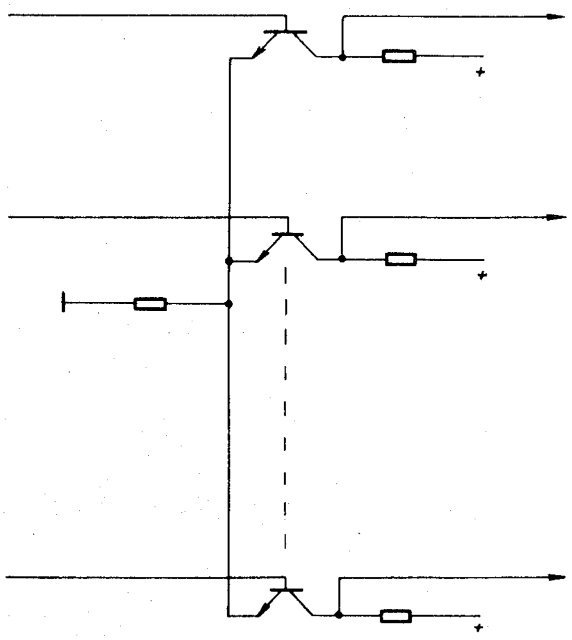
FIG. 13 shows an example of the circuitry of an extreme value detecting circuit.

FIG. 13 shows an example of a circuit of an extreme value detecting circuit. Despite the fact that the recognition circuit is purely digital a genuine majority decision is obtained for the most probable character.

It will be appreciated that the highest total counted may alternatively be detected by digital methods used in computer techniques.

We claim:

1. An arrangement for character recognition in which the characters are broken up into their characteristic shape elements comprising:

a series of optical transducers for scanning the height of a character, said series of transducers is longer than the height of the characters to be scanned;

means coupled to said transducers for producing a signal for each transducer which indicates the black and white elements per column scanned, and the distribution of black and white elements per column indicates the shape element;

a two-dimensional shift register for storing shape elements column by column;

a probe network comprising an electrical matrix representing all possible shape elements and having as many columns as said shift register;

a probe register for serially coupling said shape elements to said network row by row;

first detecting means coupled to said network for determining which row of the probe network delivers a strongest signal representing a most similar shape element;

recognition means coupled to said detecting means for assigning all detected shape elements to relevant characters on the basis of their location in a character area, said area being organized into zones having a variable number of rows according to a predetermined criteria;

means for varying the number of rows according to the height of a character including a height register coupled to said shift register, a row counter input gated from the output of said height register, and a zone counter coupled between said row counter and recognition circuit;

counting means coupled to said recognition circuit for determining the character with the largest number of assigned shape elements; and second detecting means for recognizing said determined character.

2. The arrangement of claim 1 wherein said row counter is a ring counter which is indexed by a common clock generator.

3. The arrangement of claim 2 wherein said zone counter has stages equal to the number of zones having different numbers of rows, and each stage is gated to said recognition circuit.

4. The arrangement of claim 3 including a binary counter for each character wherein probe set signals are added, said binary counters being logically connected to those probe outputs which indicate the character associated with a particular counter.

5. The arrangement of claim 4 including means for weighting the probe set signals.

6. The arrangement according to claim 5 wherein the probe outputs are fed by connecting them directly to a second, third, or following stage of an associate binary counter.

7. The arrangement according to claim 4 including a buffer store to recognize that a predetermined probe has previously responded, and said probe store being connected to the counter by an AND-circuit.

8. The arrangement according to claim 7 including a single logic element connected to the relevant counter for similar shape elements in different characters.

* * * * *